United States Patent [19]

Kubacak

[11] 4,252,274
[45] Feb. 24, 1981

[54] ROADSIDE SPRAY APPARATUS
[76] Inventor: Johnny L. Kubacak, Rte. 1, Box 119JK, Bulverde, Tex. 78163
[21] Appl. No.: 90,437
[22] Filed: Nov. 1, 1979

Related U.S. Application Data

[63] Continuation of Ser. No. 836,702, Sep. 26, 1977, abandoned.
[51] Int. Cl.$^3$ .............................................. B05B 1/20
[52] U.S. Cl. .................................. 239/163; 239/165; 239/170; 239/172; 239/176; 239/288.5; 239/305
[58] Field of Search .............................. 239/165–170, 239/172, 163, 175, 150, 287, 288.3, 288.5, 176, 304, 305

[56] References Cited
U.S. PATENT DOCUMENTS

| | | | |
|---|---|---|---|
| 378,672 | 2/1888 | Gathright | 239/166 |
| 2,518,952 | 8/1950 | Sohmer | 239/165 |
| 2,655,405 | 10/1953 | Lattner | 239/169 |
| 2,974,875 | 3/1961 | Brown, Jr. | 239/150 |
| 2,995,307 | 8/1961 | McMahon | 239/161 |
| 3,565,341 | 2/1971 | Burroughs | 239/169 X |
| 3,826,431 | 7/1974 | Telge | 239/170 |
| 3,994,310 | 11/1976 | Brandon | 239/288.3 |

*Primary Examiner*—Robert B. Reeves
*Assistant Examiner*—Michael J. Forman
*Attorney, Agent, or Firm*—Cox & Smith Incorporated

[57] ABSTRACT

A roadside spray apparatus primarily adapted for the precision application of chemical herbicides is mounted by means of a frame support on the front bumper of a vehicle and is monitored by the driver of the vehicle using one hand to operate electrical switches connected to solenoid valves controlling the spray through nozzles mounted on a spray boom, which boom can be adjusted laterally and can be pivoted from one side of the vehicle to the other, with the nozzles attached to coil springs on the spray boom, and with an adjustable mirror and adjustable guides located on the spray apparatus in view of the driver of the vehicle.

16 Claims, 18 Drawing Figures

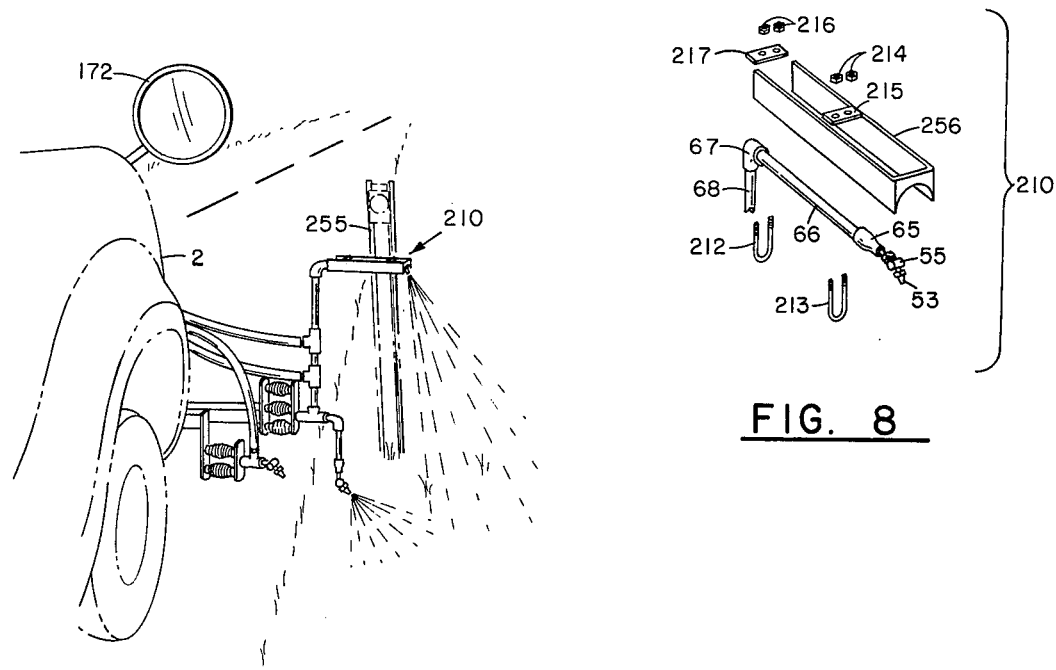
FIG. 9
FIG. 8
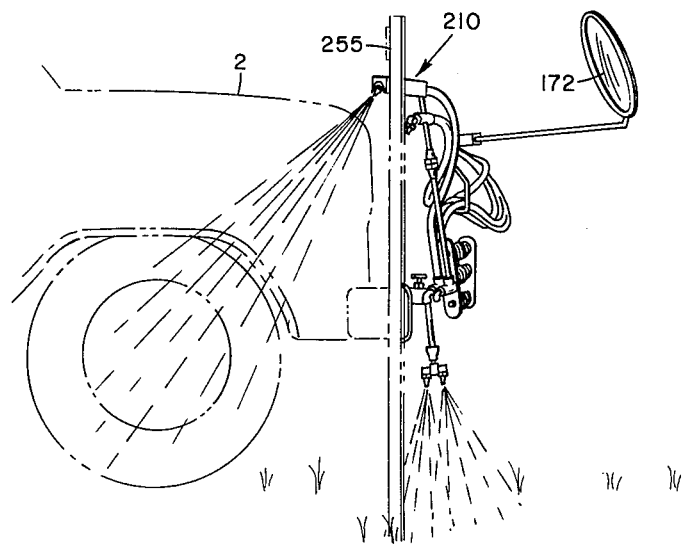
FIG. 10
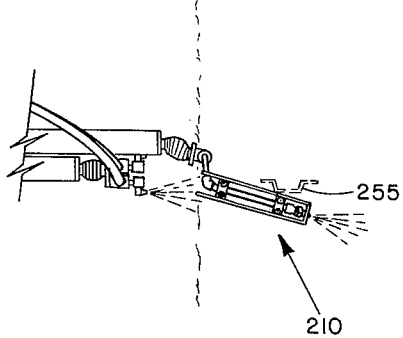
FIG. 10b

ROADSIDE SPRAY APPARATUS

This is a continuation, of application Ser. No. 836,702, filed Sep. 26, 1977 now abandoned.

BACKGROUND OF THE INVENTION

1. Field of the Invention

This invention relates to spray apparatus and is more particularly directed to automated apparatus for roadside spraying of herbicides which is mounted on a detachable frame fixed to the front of a vehicle and controlled by the operator of the vehicle and comprises a series of independent switches mounted on a control panel in the drivers compartment of the vehicle within reach of the driver, which switches control a plurality of solenoid valves and thus the spray through nozzles mounted on the detachable frame.

2. Description of the Prior Art

Maintenance costs of highway systems have escalated dramatically in the recent past. Such escallation is due in part to the constant extension of the state and federal highway systems and in part to the constantly increasing cost of labor. A significant item in highway maintenance cost is the control of vegetation growing along the highway right-of-way and the need to prevent vegetation from growing into shoulders and the roadway proper.

Mechanical cutting of such vegetation is possible along the right-of-way but is not satisfactory for keeping the shoulder and roadway free of vegetation. The latter has been achieved primarily through use of chemical herbicides. Herbicides used primarily for control of broadleaf weeds and some unwanted grasses are used extensively on the right-of-way, leaving desirable grasses alive for erosion control. Such herbicides are termed selective in that they do not kill the desirable grasses. Herbicides used primarily for control of vegetation on shoulders and in the roadway are intended to kill all vegetation and hopefully prevent its regrowth for some period of time. Such herbicides are termed residuals if they are able to prevent regrowth for some time. For the purposes of this description the treatment of vegetation with contact herbicides and residual herbicides is much the same and will be included in the description of the application of residual herbicides.

Prior art methods of applying herbicides fall generally into two generic procedures. Those are application from hand operated sprayers and from mechanized mobile spray apparatus. The former procedure is used almost exclusively for residual herbicides because of the precision of application necessary with residual herbicides. However, hand operation is slow, entails very high labor cost, requires a large number of individuals to keep pace with the miles and miles of roadside, and is limited to application of only the single herbicide contained in the spray tank.

Mechanized apparatus, such as that diclosed in U.S. Pat. Nos. 2,995,307; 3,554,009 and 3,913,836 is designed and used primarily for the application of selective herbicides on the area between the shoulder of the highway and the edge of the right-of-way. Such equipment lacks adequate control of speed, rate of application and regulation of the distance between spray-head and ground to achieve the precision of application necessary for residual herbicides. If applied too liberally there will be run-off of residual herbicides and desirable vegetation on the right-of-way will be killed or damaged. If applied at too low a rate the residual herbicide will not prevent the growth of vegetation on the shoulders or in the roadway. Such mobile sprayers still require the use of two men in many instances and require two trips down each side of the roadway if they are used for the application of both selective and residual herbicides.

The apparatus of this invention permits for precise application of herbicides as is necessary for residual herbicides The application can be made by a single operator of the vehicle. By use of the dual system embodiment both residual and selective herbicides can be applied by a single operator with finger-tip control to avoid run-off of the residual herbicides and to prevent residual herbicide being sprayed around trees or other desirable vegetation.

SUMMARY

In summary this invention is directed to roadside spray apparatus mounted on the front of a vehicle and adapted for spraying chemical herbicides, which apparatus comprises a frame, a boom arm, spray nozzles positioned on coil springs on the boom arm, at its outer reaches, said nozzles being connected to a reservoir of herbicide and being controlled by solenoid valves activated by electrical switches situated in the vehicle convenient to the driver.

BRIEF DESCRIPTION OF THE DRAWINGS

In the drawings:

FIG. 8 is an exploded perspective view of a single nozzle protective guard.

FIG. 9 is a perspective rear view of the outer nozzles of the spray apparatus of this invention engaging an obstruction.

FIG. 10 is a perspective side view of the outer nozzles shown in FIG. 9.

FIG. 10b is a perspective top view of outer nozzles of the spray apparatus of this invention engaging an obstruction.

DESCRIPTION OF THE INVENTION

Figure 1:
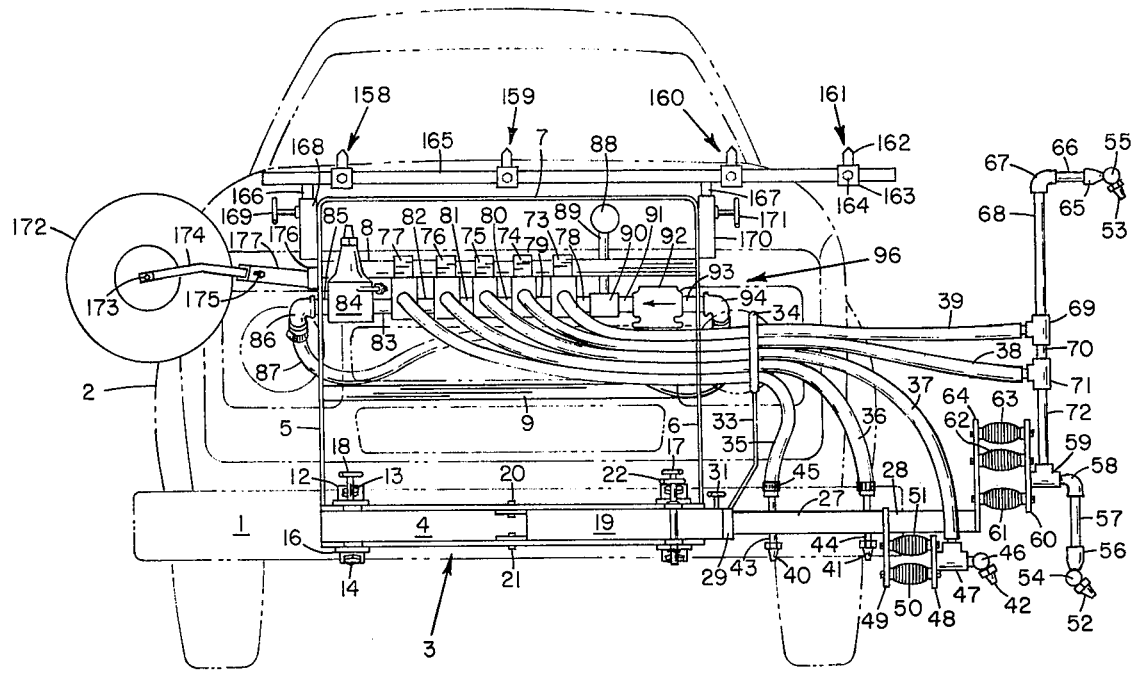
FIG. 1 is a perspective view in phantom of a vehicle showing an embodiment of this invention mounted on the front end.

Referring now to FIG. 1, there is shown an illustrative embodiment primarily adapted for spraying herbicides on highways or roadsides. This system is used for the application of a single herbicide in a single treatment as the unit is operating on the roadside. Attached to the bumper 1 of the vehicle 2, shown as a motor truck, is a supporting frame 3, consisting of a horizontal one-half I beam 4, two vertical frame bars 5 and 6 which are attached on the lower end to the one-half I beam 4 and a horizontal frame bar 7 attached at both ends to the vertical frame bars 5 and 6. Upper and lower horizontal solenoid bars 8 and 9 are attached respectively at both ends to vertical frame bars 5 and 6. The combination of these members 4,5,6,7,8 and 9 provide the supporting frame 3 for the spray apparatus.

Figure 2:
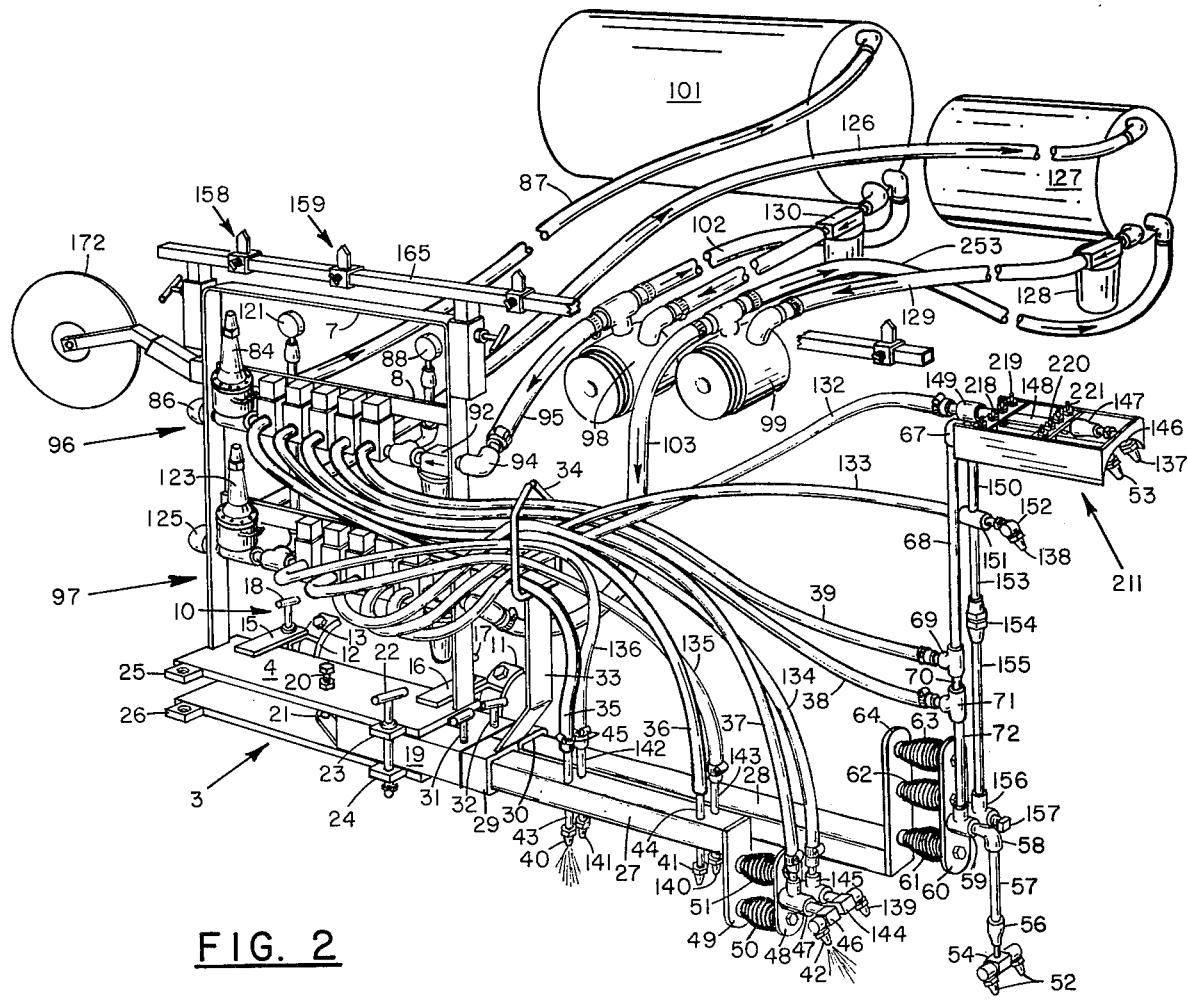
FIG. 2 is a plan view of a preferred embodiment of this invention showing spray capability for dual herbicides.

The supporting frame 3 is provided with a quick disconnect system 10 seen in greater detail in FIG. 2, and consists of left and right bumper mounts 11 and 12 which are each connected to the bumper 1 by means such as bolts 13 and 14. Two horizontal bars 15 and 16 shown in FIG. 2, are connected on each end to the one-half I beam 4 to complete the quick disconnect system 10. Two locking means 17 and 18 in FIG. 1 provide a means of quickly disconnecting the supporting frame 3 from the bumper 1.

Figure 4:
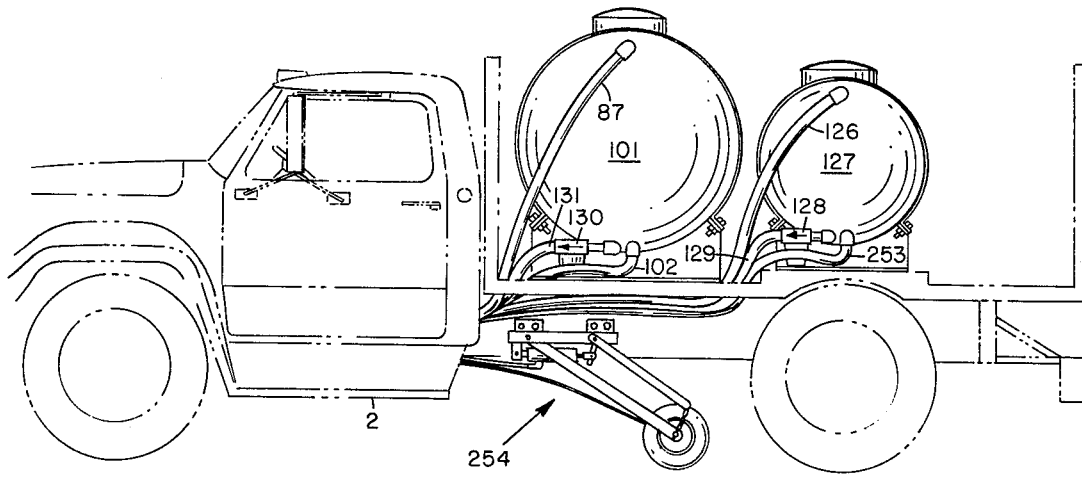
FIG. 4 is a perspective side view of the spray tanks for dual herbicide application mounted on a vehicle along with a fifth wheel.
Figure 5:
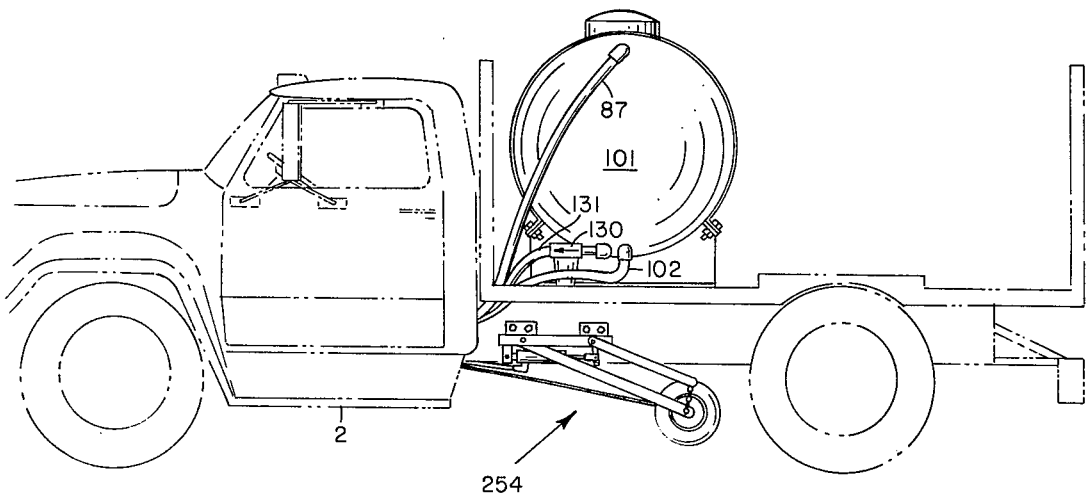
FIG. 5 is a perspective side view of the spray tank for single herbicide application mounted on a vehicle along with a fifth wheel.

FIG. 2 shows a double system for the application of different herbicides applied from separate fluid systems. For example, fluid system 96 can be used for the application of a residual herbicide as a general bare ground treatment whereas the second fluid system 97 can be used for the application of a non-residual herbicide in areas near desirable vegetation such as trees and shrubs. Systems 96 and 97 are the same and the vehicle operator can instantly switch from the application of one herbicide to the other by simply throwing a toggle switch (shown as 189 in FIG. 6a or 208 in FIG. 7). The holding tank 101 for the single system of FIG. 1 is best illustrated in FIG. 5, whereas the holding tanks 101 and 127 used for the dual system of FIG. 2 are best illustrated in FIG. 4.

Figure 3:
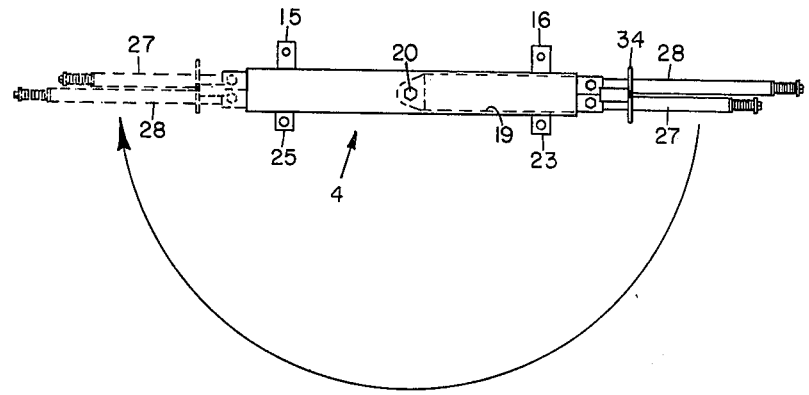
FIG. 3 is a plan view of the boom arm of the apparatus of this invention which can be rotated 180°.

The one-half I beam 4 has a horizontal pivoting arm 19 shown in FIG. 1 and in greater detail in FIGS. 2 and 3. The pivoting arm 19 swivels on two connecting means 20 and 21 180° from the left side to the right side of the vehicle 2. A locking means 22 in this preferred embodiment in FIG. 2 removably engages holes 23, 24, 25 and 26 provided for in the one-half I beam 4.

The pivoting arm 19 can be thus locked into position on either side of the supporting frame 3. The booms 27 and 28 are held in position by inside and outside sleeve tubes 29 and 30 in FIG. 2. These sleeve tubes 29 and 30 are respectively connected at each end to the horizontal pivot arm 19. The booms 27 and 28 are firmly locked in a lateral position with means 31 and 32.

The inside boom 27 in FIG. 1 consists of three spray nozzles 40, 41 and 42. Nozzles 40 and 41 are attached to nipples 43 and 44. A hose 35 is used to connect nipple 43 to solenoid valve 77 and is held tight at each end by clamping means 45. Hoses 36, 37, 38 and 39 are also attached to nozzles 41, 42, 52 and 53 and at the other end to solenoid valves 76, 75, 74 and 73. Edge nozzle 42 is mounted on a single swivel 46 which is attached to a tee 47 connected to a vertical base plate 48. All of the hoses 35, 36, 37, 38, and 39 of FIG. 1 and hoses 132, 133, 134, 135 and 136 of FIG. 2 are held in position on the sleeve tubes 29 and 30 by the use of a support 33 and retainer 34. The outside vertical base plate 48 is connected to the inside vertical base plate 49 by a series of coil springs 50 and 51 and are held in position by connecting means. The inside vertical base plate 49 is connected to the inside boom 27. The outside boom 28 in FIG. 1 carries guardrail nozzles 52 and the outside top nozzle 53. Guardrail nozzles 52 are mounted on a double swivel 54 to allow adjustment depending upon the spray pattern desired. The outside top nozzle 53 is mounted on a single swivel 55 for obtaining the desired spray pattern. The double swivel 54 is supported by a housing 56, nipple 57, elbow 58, and a tee 59 which is connected to one end to a base plate 60 on the outside boom 28. The outside base plate 60 is held in position by three coil springs 61, 62 and 63 connected at each end through holes in base plates 60 and 64. Inside base plate 64 is connected to the outside boom 28. The top outside swivel 55 is connected to the base plate 60 by a housing 65 nipple 66, elbow 67, nipple 68, tees 69 and 71 and nipple 72. A solid nipple 70 threaded at both ends connects the two tees 69 and 71. The solid nipple 70 is used to keep the spray solution from mixing from nozzles 52 and 53.

A nozzle guard system 210 which can be seen in detail in FIGS. 8, 9, 10 and 10b provides the protective mechanism which prevents nozzle 53 from being torn off as it comes into contact with roadside structures such as delineator posts 255. The protective shields 256 also houses elements 55, 65, 66 and 67 and is held securely in position by clamp means 212 and 213 connected to plates 215 and 217 by means 214 and 216.

The upper solenoid bar 8 in FIG. 1 has connected to it a series of five solenoid valves 73, 74, 75, 76 and 77. Each solenoid is connected by nipples 78, 79, 80, 81, 82 and 83. A pressure gauge 88 indicates to the vehicle operator if the system is functioning properly. The pressure gauge 88 is connected to the main fluid system by nipple 89 and tee 90. A nipple 91 connects the tee 90 to a filter screen 92. Herbicide solution comes from tank 101 as illustrated in FIG. 5 and passes through screen 130, suction hose 131 and pump 98 in FIG. 2. Part of the solution goes back into the holding tank 101 as illustrated in FIGS. 2 and 7.

Figure 7:
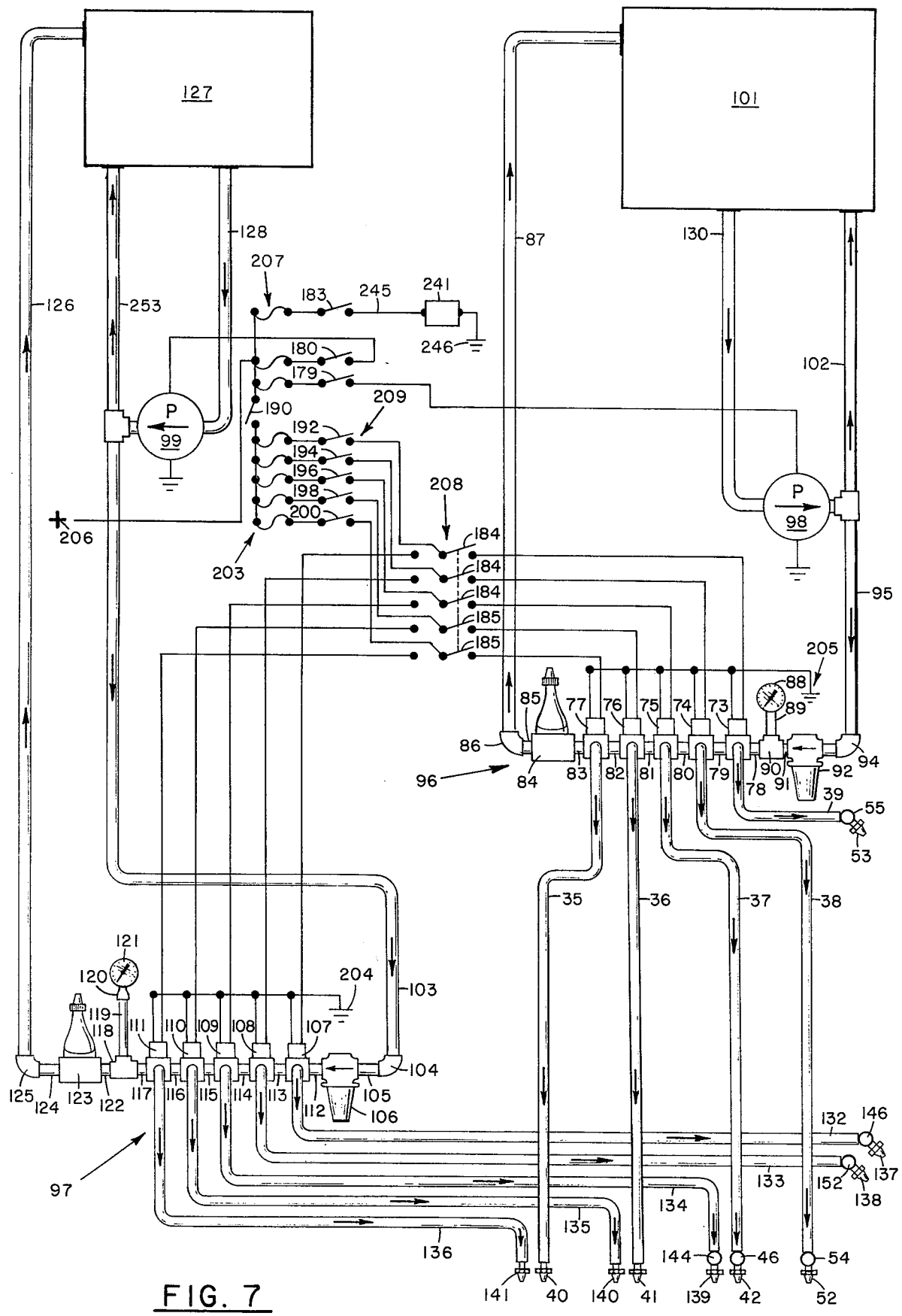
FIG. 7 is a schematic view of the spray apparatus of this invention.

Systems 96 and 97 used for the application of two different herbicides in separate operations are best illustrated in FIGS. 2 and 7. The upper solenoid system 96 used in FIG. 2 is the same as the upper solenoid system in FIG. 1. Spray solution from the lower solenoid system 97 comes from the holding tank 127 and passes through suction line strainer 128, suction hose 129 and into pump 99. Part of the spray material goes back through line 253 into the holding tank 127 to be used for agitation purposes. The rest of solution passes through hose 103, elbow 104, nipple 105 and into a filter screen 106 before going into solenoid valves 107, 108, 109, 110 and 111. These solenoid valves are connected by nipples 112, 113, 114, 115, 116 and 117. A pressure gauge 121 gives the vehicle operator an exact reading of pressure within the system. The gauge is connected by housing 120, nipple 119, tee 118 and nipple 122. The pressure relief valve 123 allows excess spray solution to pass through nipple 124, elbow 125, through hose 126, back into holding tank 127. The electric solenoid valves 107, 108, 109, 110 and 111 of the lower solenoid system 97 pass the spray solution into respective hoses 132, 133, 134, 135, and 136 and into the respective spray nozzles 137, 138, 139, 140 and 141. Hoses 135 and 136 are connected to pipe nipples 143 and 142 which are connected to inside boom 27. Hose 133 is connected to tee 145 and single swivel 144. Hose 133 is connected to coupling 151 and single swivel 152. Nipples 153 and 155 and tee 156 are the supporting means for nozzles 137 and 138. A union 154 allows the operator to dissemble the outside double nozzle system. Nozzle 137 is connected to coupling 151 by a single swivel 146 housing 147, nipple 148, tee 149 and nipple 150. Nipples 150 and 153 are attached to the coupling 151.

The protective shield 211 for the dual system illustrated in FIG. 2 is held securely in position by clamp means 218, 219, 220 and 221 connected around nipples 66 and 148. A plug 157 can be removed if an additional nozzle is desired.

Figure 12:
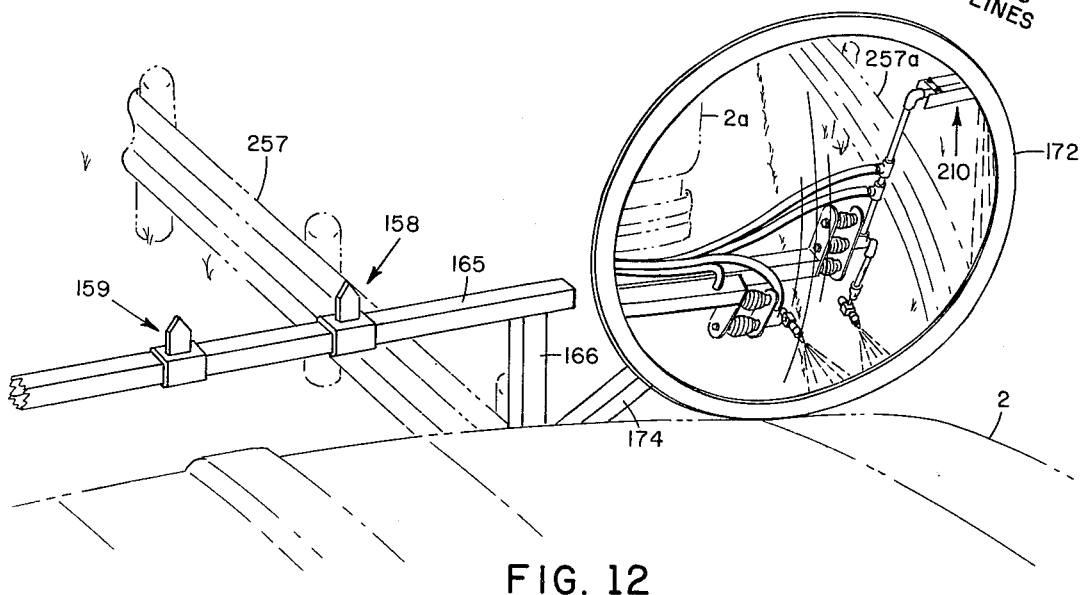
FIG. 12 is a perspective view from inside the vehicle illustrating the use of the guide bars and mirror.

A horizontal guide bar 165 as illustrated in FIGS. 1 and 2 is attached to two guide support bars 166 and 167. Two sleeves 168 and 170 are attached on the sides to the supporting frame 3. Fixing means 169 and 171 allow the truck operator to adjust the guide bar 165 up or down to obtain the proper height for the driver to align the guides 158, 159, 160 and 161 on objects in the spray area, on the highway or roadside. This process is best illustrated in FIG. 12. The individual guide 158 is followed on top of the guardrail 257 as the vehicle is traveling down the road. Each individual guide as illustrated in FIG. 2 consists of a guide sight 162, slip tube 163 and a fixing means 164. Also shown is a large convex mirror 172 wherein the truck operator can see a reflection of the nozzle spray pattern, truck fender 2a, and guardrail 257(a). The mirror 172 in FIG. 1 is attached by means 173 to adjustable arm 174 and can be adjusted inward or outward by loosening fixing means 177 located on a sleeve tube 175. The sleeve tube 175 can be adjusted up or down by loosening fixing means 176 on the mirror bracket 176. The mirror 172 is adjusted so the truck operator can see nozzles 41, 42 and 52 or the combination of 41, 42, 52, 137, 138 and 139 as the booms are operating on the right side of the vehicle 2 as illustrated in FIG. 12.

Figure 11:
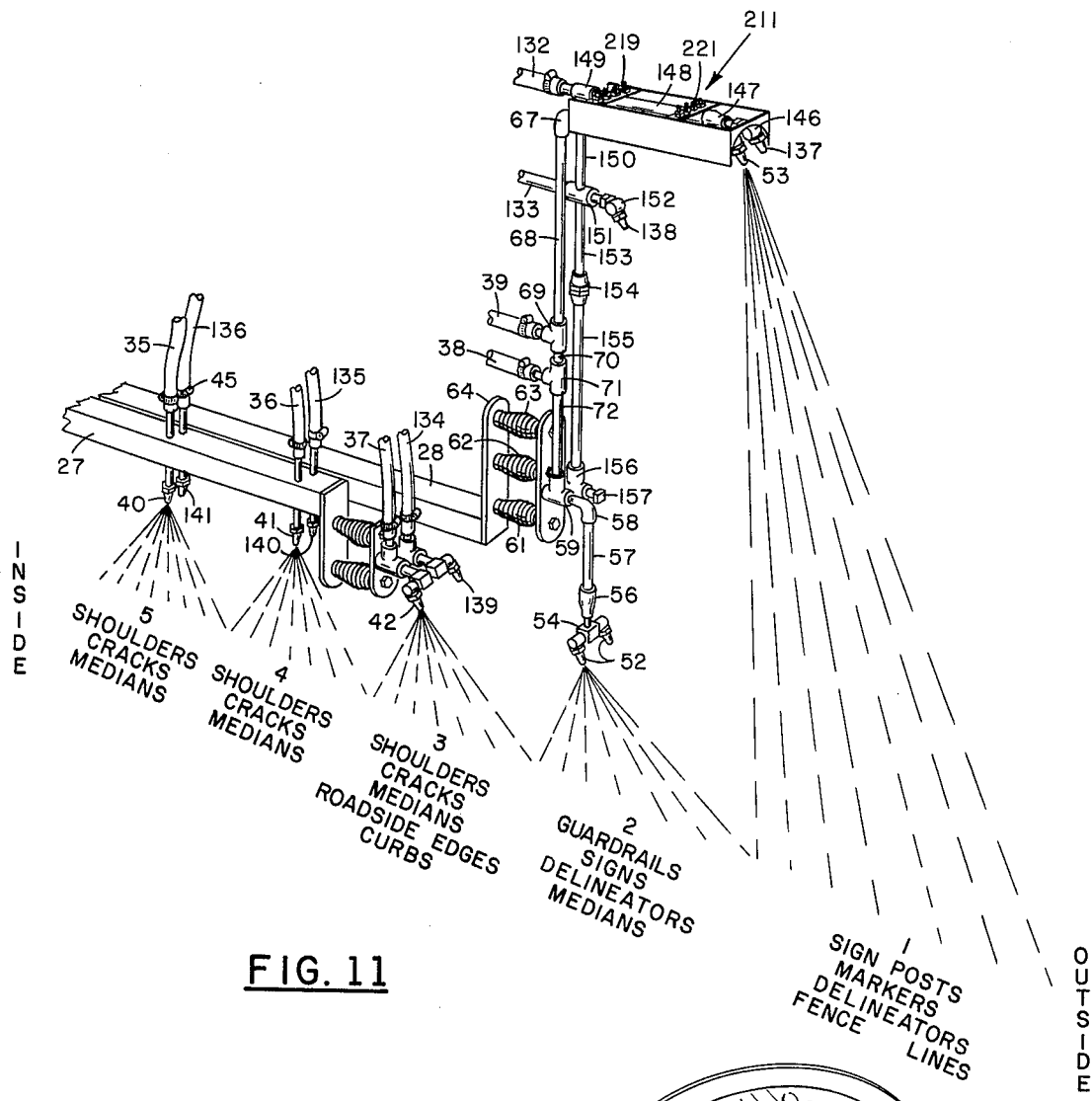
FIG. 11 is a perspective view illustrating some of the various spray treatments possible with the apparatus of this invention.

FIG. 11 shows various areas where each individual nozzle 40, 41, 42, 52 and 53 can be used. The numbers below each nozzle spray pattern 1, 2, 3, 4 and 5 correspond to the numbers listed below individual toggle switches 192, 194, 196, 198 and 200 in FIG. 6a. These numbers help the operator to identify which nozzle he should be using at any particular time to cover a desired target area.

Figure 6:
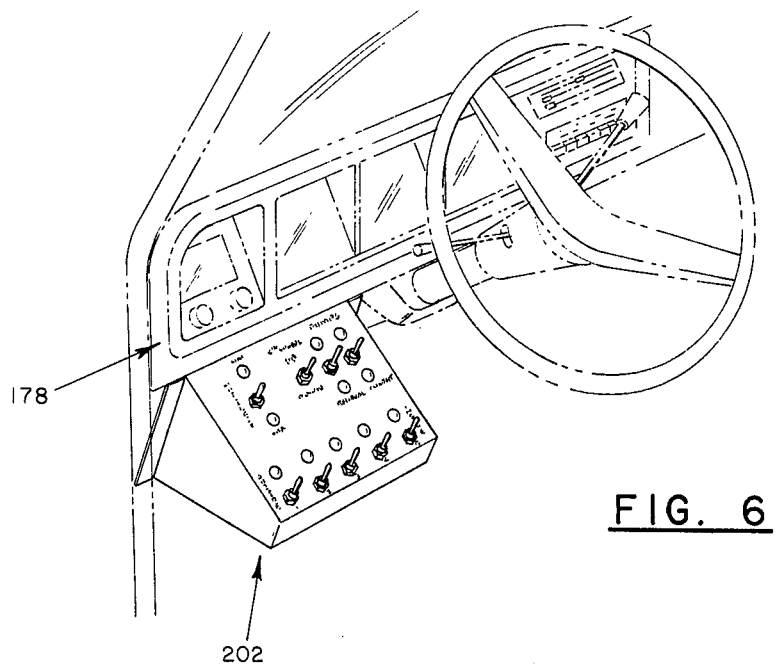
FIG. 6 is a fragmentary view in phantom of a vehicle with a control panel mounted inside the cab.
Figure 6A:
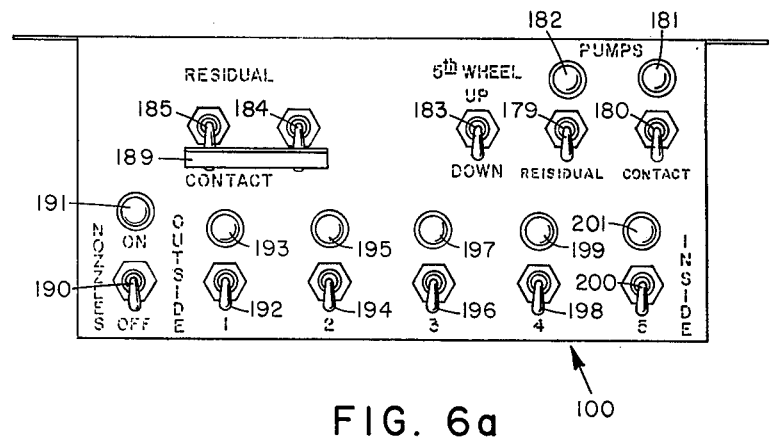
FIG. 6a is an elevational view of the face of a control panel for the spray apparatus of this invention.
Figure 6B:
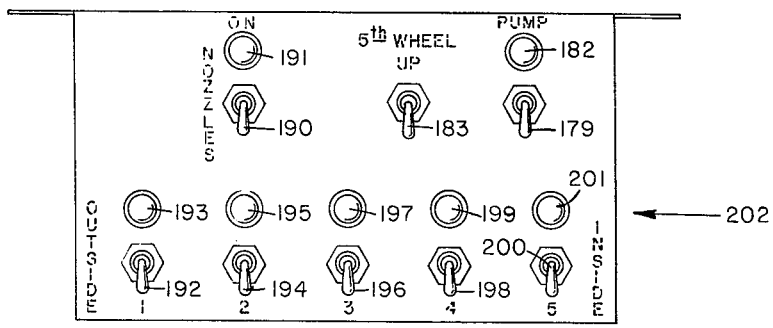
FIG. 6b is an elevational view of the face of a control panel for an alternate embodiment of the spray apparatus of this invention.

Referring now to FIG. 6, there is shown an illustrative embodiment of the control panel 202 as it is mounted on the vehicle dash 178. The control panel 100 in FIG. 6a is used for the application of two different herbicides in separate applications utilizing the dual spray apparatus of FIGS. 2 and 4. The control panel 202 in FIG. 6b is for the application of only one herbicide utilizing the spray apparatus in FIGS. 1 and 5.

A schematic diagram of the electrical system for both the single system 96 and dual systems 96 and 97 is shown in FIG. 7. The electrical switches in FIG. 7 correspond to the switches in control panels in FIGS. 6a and 6b.

The electrical source can be the battery 206 as shown, which supplies electricity to the nozzle kill switch 190.

All the nozzles can be instantly shut off by means of the off-on switch. Electricity passes from the battery 206 directly to the pump switches 179 and 180. The pump 98 for either the single herbicide system 96 or the double system 96 and 97 can be controlled with the off-on switch 179. The contact herbicide pump 99 is controlled by off-on switch 180. Electricity passes from the fuse box 203 and can be directed to any one or combination of solenoids in either the residual 96 or contact system 97 by the flip of any combination of off-on switches 192, 194, 196, 198 or 200 on either control panel 100 or 202 in FIGS. 6a or 6b. Electricity for the control panel 202 in FIG. 6b passes directly from the nozzle control switches 209 in FIG. 7 to the solenoid system 96. The control panel 100 in FIG. 6a for the double system 96 and 97 requires the addition of contact and residual herbicide transfer switches 208 in FIG. 7. A triple pole-double throw switch 184 and a double pole-double throw switch 185 are required to transfer the direction of the electricity from the residual 96 to the contact herbicide 97 in FIG. 7. The solenoid in both the contact 97 and the residual 96 system are grounded 204 and 205 to the vehicles body frame. With the flip of all of the switches 209 or individual switches 192, 194, 196, 198 and 200 any combination of solenoid valves can be opened and solution is allowed to pass to the nozzles. Switches 208 containing double throw-six poles switch 185 and double throw-nine pole switch 184 can be used by the vehicle operator to instantly switch from the application of residual herbicide to the contact herbicide as he is nearing desirable trees or shrubs on the roadside.

Panel lights 193, 195, 197, 199 and 201 in FIGS. 6a and 6b are used to indicate to the vehice operator when individual solenoid valves are open. Pump switch 179 and 180 are connected respectively to indicator lights 182 and 181. The master nozzle switch 190 is connected to indicator light 191.

Figure 14:
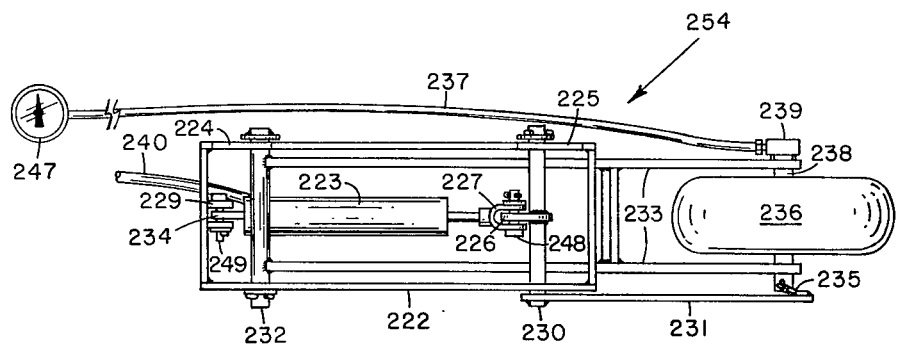
FIG. 14 is a top view of the optional fifth wheel shown in FIG. 13.
Figure 13:
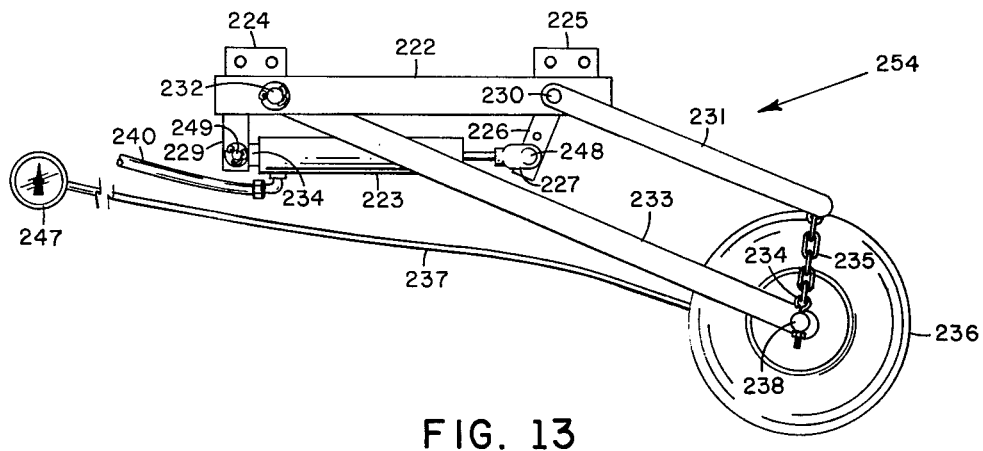
FIG. 13 is a plan view of the optional fifth wheel to provide a tachometer reading in feet per minute.
Figure 15:
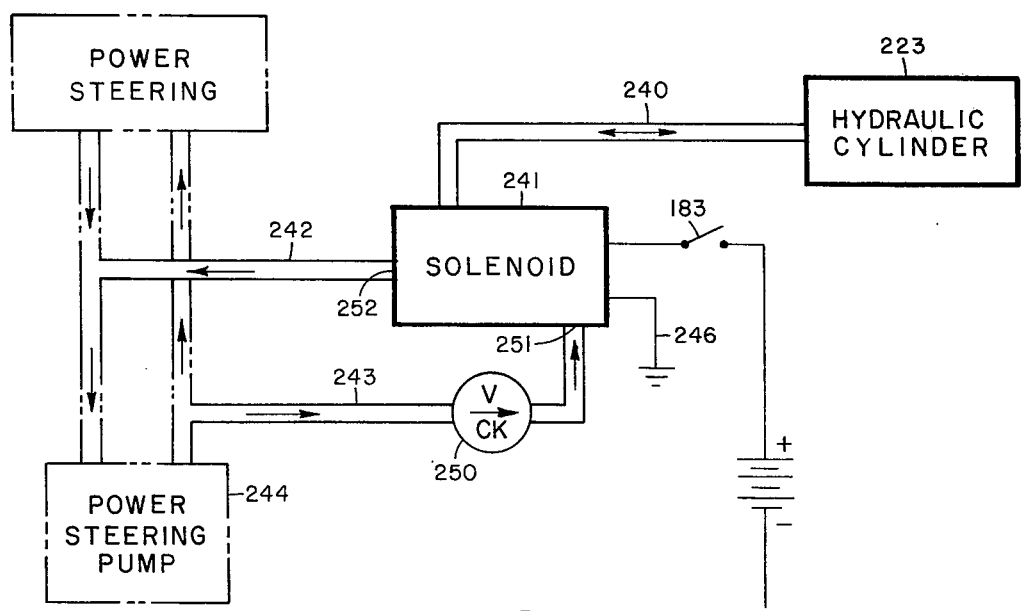
FIG. 15 is a schematic view of the hydraulic system used to raise and lower the fifth wheel.

Precision application of residual herbicides can be obtained only if the vehicle operator is driving at precisely controlled speeds. This can advantageously be measured by a fifth wheel and tachometer as illustrated in FIGS. 13, 14, and 15. The lift system on the fifth wheel is designed for ease of operation since the vehicle operator has responsibility for the control panel, operation of the trunk and safety to other vehicles on the roadside.

The fifth wheel 254 lift system operation is a combination of hydraulic and electric design and is attached to the left side of the vehicle frame as in FIG. 4.

Referring now to FIGS. 13 and 14, the rectangular supporting frame 222 can be constructed of angle iron connected at the four corners. The wheel 236 rotates on axle 238. The cable gear box 239 is linked to the axle 238. The cable 237 connects to the tachometer dial 247 located on the vehicle dash panel 178. The truck driver reads the tachometer 247 in feet per minute. In FIG. 14 the wheel support arms 233 are connected to the wheel axle 238 at the lower end and the supporting frame 222 on the upper end by a wheel support rod 232 which passes through a hold in each side of the supporting frame 222. A hydraulic cylinder 223 is firmly affixed at the front clevis 229 to a cylinder brace 258 and held in place by a pin 249. The rear clevis 227 is pinned 248 to a movable brace 226. The movable brace 226 is attached at the lower end to the lift arm rod 230. The lift arm rod 230 passes through holes in both ends of the supporting frame 222 and moves freely to allow the lift arm 231 to raise and lower the wheel 236. The lower end of the lift arm 231 is connected by means 235 to the wheel support arm 233 located near the wheel axle 238.

The fifth wheel hydraulic system is connected to an electric solenoid valve 241 and power steering pump 244 as shown in FIG. 15. Hydraulic pressure from the power steering pump 244 passes through the pressure line 243 into a one-way check valve 250 and into the electric solenoid 241. The electric solenoid 241 is operated from control panels 100 or 202 in FIGS. 6a or 6b. The fifth wheel switch 183 when turned to the on position passes electricity from the pump fuse box 207 shown in FIG. 7 to the electric solenoid valve 241 allowing the pressure port 251 to open causing hydraulic fluid to flow through the pressure line 243 and 240 to extend the hydraulic cylinder 223. The solenoid valve 241 is grounded 246 to the vehicle 2. When the switch 183 in FIG. 7 is turned off the pressure port 251 is closed and the depressure port 252 is opened allowing the hydraulic fluid in the hydraulic cylinder 223 to flow back into the power steering pump 244 through the relief line 242 causing the wheel to be lowered. The lowered wheel 236 rotates when it comes into contact with the road surface and operates the tachometer dial 247. The fifth wheel 254 is bolted to the frame of the vehicle 2 by plates 224 and 225.

From the foregoing description and illustration of this invention it is apparent that various modifications can be made by rearrangement of the elements or by substitution to produce similar results. It is therefore the desire of the applicant not to be bound by the description of this invention as contained in this specification but to be bound only by the claims as appended hereto.

I claim:

1. A spray apparatus primarily adapted for roadside spraying from a moving vehicle, comprising:
   an extended fixed frame carried at the forward end of the vehicle and within view of an operator of said vehicle,
   said frame having a lower horizontal channel member substantially parallel with and attached to the front of said vehicle,
   said lower horizontal channel member being the main support for vertical and horizontal supporting bars which vertical supporting bars are attached at their upper ends to an upper horizontal bar and which completes the fixed frame,
   said lower horizontal channel member also being the supporting member for a horizontal boom arm which is mounted on the inside of and pivots at the center of said lower horizontal channel member and may be pivoted to be positioned at either side of said vehicle,
   said arm bearing means for locking the horizontal boom arm into position on either side of said vehicle,
   said horizontal boom arm comprising permanently mounted tubular sleeves housing horizontal inner and outer telescoping boom members which are extendable and retractable laterally relative to the tubular sleeves,
   said boom members bearing spray means connected to a reservoir of spray material.

2. A spray apparatus of claim 1, wherein:
   said inner and outer boom members are held in position by individual locking means mounted on the outside of the tubular sleeves,
   said boom members having flexible coil springs mounted on their outer extremity, with a spray nozzle situated between the tubular sleeve and coil springs on said inner boom member and a spray nozzle situated outside of said springs on both said inner and outer boom members,
   said nozzles being mounted on pipe attached to said boom members and connected by tubing to a reservoir of spray material.

3. A spray apparatus of claim 2, wherein:
   said outer boom member has a plurality of flexible springs mounted on its extremity and a plurality of nozzles mounted on pipe attached to said boom member and positioned at lower and upper locations on the outside of said coil springs and including a protective shield affixed beside the nozzles positioned outside of said coil springs at said upper location.

4. A spray apparatus in accordance with claim 2, characterized by:
   a mirror pivotally mounted on an adjustable arm attached to the fixed frame such that the operator can see the nozzles as they are operating on the side of the vehicle opposite of the operator.

5. A spray apparatus in accordance with claim 2, wherein:
   the nozzles located from the lateral center of said vehicle to the outside edge of the inside boom are positioned at a height not substantially less than eighteen inches above ground level.

6. A spray apparatus in accordance with claim 2, wherein:
   the flexible coil springs with a plurality of nozzles located to the outside of said coil springs are located at heights ranging between ten inches and forty-eight inches above ground level.

7. A spray apparatus in accordance with claim 2, wherein:
   the direction of spray of said nozzles is adjustable with respect to distances desired to be sprayed away from the side of said vehicle.

8. A spray apparatus of claim 1, wherein:
   the lower horizontal channel member of the frame is attached to bar means detachedly connected by locking pins to bumper mounts fixedly connected to the front bumper of the vehicle,
   said pins being located on the back side of the lower horizontal channel member and which can be pulled to detach the supporting frame from the vehicle.

9. A spray apparatus of claim 1, characterized by:
   two additional horizontal members located between the lower channel member and the upper bar and being upper and lower horizontal bars for a plurality of electric solenoid valves located within the supporting framework.

10. A spray apparatus in accordance with claim 9 for the application of a single herbicide comprising:
    a plurality of electric solenoid valves on the upper horizontal solenoid bar and which are electrically controlled by a plurality of switches on a control panel located inside the vehicle, which can be activated individually and in concert, with spray fluid being supplied by means of a pump attached to and operated by the engine of said vehicle with hoses connecting each solenoid valve to a nozzle located along said boom members.

11. A spray apparatus in accordance with claim 10, which:

incorporates a pressure gauge which can be easily read above the vehicle hood by the operator.

12. A spray apparatus in accordance with claim 9 for the application of two herbicides at different intervals during the same operation comprising:

a plurality of solenoid valves located on the upper horizontal solenoid bar and a plurality of solenoid valves located on the lower horizontal solenoid bar, with all said solenoid valves electrically controlled by switches inside the vehicle which can be activated individually and in concert, with a double throw switch having a plurality of poles which when changed from one position to another switches from the application of one position to another switches from the application of one herbicide passing through one solenoid system and nozzles to a second solenoid system and with hoses connecting said solenoid valves and nozzles with spray fluid being supplied to the separate solenoid systems by means of separate pumps.

13. A spray apparatus in accordance with claim 12, which:

incorporates pressure gauges for each separate system which gauges can be easily read above the vehicle hood by the operator.

14. A spray apparatus in accordance with claim 1 having attached on the upper horizontal bar a guide system consisting of:

a vertical bar which can be adjusted vertically and bearing a plurality of adjustable guide markers which can set within the operators vision above the hood of said vehcile to be directed upon areas to be sprayed permitting exact placement of the herbicide to the target area.

15. A spray apparatus for securing to the front of a moving vehicle for roadside spraying, comprising:

a frame for securing to the front of the vehicles;

an arm member centrally, pivotally mounted with the frame for pivoting to either side of the vehicle for spraying either side of the roadway;

inner and outer booms individually, telescopically mounted with the arm member for pivoting with the arm member and for independent lateral extension and retraction of either boom relative to the arm member for spraying and transport of the spray apparatus;

separate spraying means mounted with each boom for selectively spraying distinct areas;

at least two valve means mounted outside the vehicle for individually controlling the separate spray means;

control panel means located inside the cab of the vehicle operatively connected to the at least two valve means and actuable by the operator to selectively control the at least two valve means mounted outside the vehicle.

16. A spray apparatus for securing to the front of a moving vehicle for roadside spraying, comprising:

a support frame for securing to the front of the vehicle;

a boom arm centrally, pivotally mounted with the frame for pivoting to either side of the vehicle for spraying either side of the vehicle at least two separate sets of spray nozzles mounted with the outer end of the boom arm and directed to spray at least two adjacent swaths at the side of the vehicle mounting means securing the spray nozzles to the boom arm so that the spray nozzles will swing rearwardly upon engaging an obstacle and return to their normal position upon disengagement with the obstacle;

said mounting means including shield means mounted with the nozzles to engage the obstacle to protect the nozzles;

at least two separate valve means for separately supplying spraying fluid to the at least two separate sets of spray nozzles;

control means for positioning in the cab of the vehicle so the operator of the vehicle can separately control the supply of fluid to either of the sets of nozzles to spray either of the adjacent swaths at the side of the vehicle.

* * * * *